United States Patent [19]

Kondou et al.

[11] Patent Number: 4,581,818
[45] Date of Patent: Apr. 15, 1986

[54] APPARATUS FOR DIE-ASSISTED SQUEEZE-FORMING, INCLUDING DIE STRUCTURE WITH RELATIVELY MOVABLE DIE PARTS FOR ACCOMODATING VARIOUSLY SIZED OR SHAPED WORKPIECES

[75] Inventors: Fumio Kondou, Nishikasugai; Kazuyori Sakakibara, Toyota; Masataka Ono, Okazaki, all of Japan

[73] Assignee: Nippondenso Co., Ltd., Kariya, Japan

[21] Appl. No.: 666,112

[22] Filed: Oct. 29, 1984

[30] Foreign Application Priority Data

Oct. 31, 1983 [JP] Japan .................. 58-204126

[51] Int. Cl.[4] ............................... B23P 15/26
[52] U.S. Cl. .................... 29/727; 29/157.3 R; 29/464; 29/513; 29/703; 29/721; 29/822; 29/DIG. 3; 72/12; 72/33; 72/441; 72/472
[58] Field of Search ............ 29/157.3 R, 157.4, 283.5, 29/464, 509, 513, 703, 720, 721, 727, 822, DIG. 3; 72/12, 33, 472, 441; 414/751; 901/6

[56] References Cited

U.S. PATENT DOCUMENTS 3,634,917 1/1972 Kortick .............. 29/513 X
4,331,201 5/1982 Hesse .................. 29/509 X Primary Examiner—Howard N. Goldberg
Assistant Examiner—Ronald S. Wallace
Attorney, Agent, or Firm—Cushman, Darby & Cushman

[57] ABSTRACT

A die-assisted squeeze-forming apparatus, for bending hooks of a plate against a container e.g. a tank, is able to be used with various shapes of the plate and container without replacement of the die structure. To that end, the apparatus is provided with a calking die structure which has a plurality of divided, relatively movable dies, each movable die being subject to being individually actuated by an actuator. The preferred embodiment of the apparatus also includes a controlling means which controls the movement of the actuators and a detecting means which detects a feature of the tank which is symbolic of the size and shape of that tank. The electric signal which indicates the feature of the container is applied to the controlling means. Then the controlling means sends a respective controlling signal for controlling the movement of the actuators in order to cause an adequate rearrangement of the shape of the calking die structure should the tank be different in size or shape then the preceeding one.

14 Claims, 4 Drawing Figures

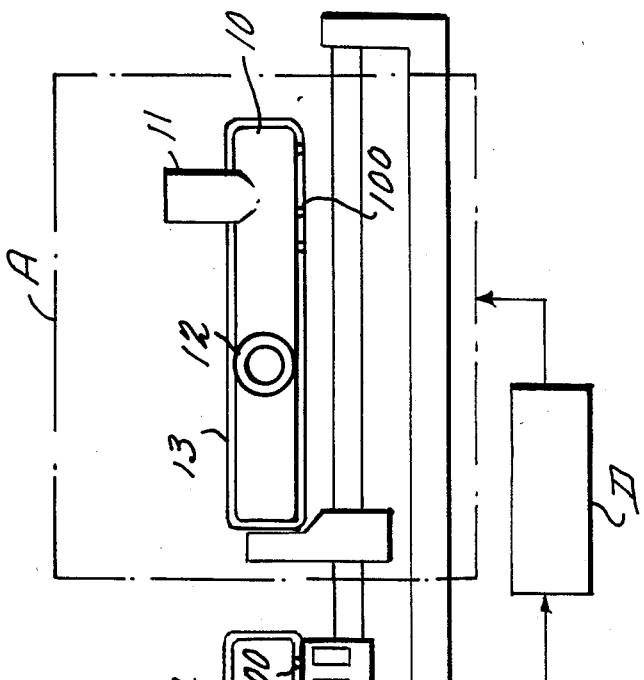
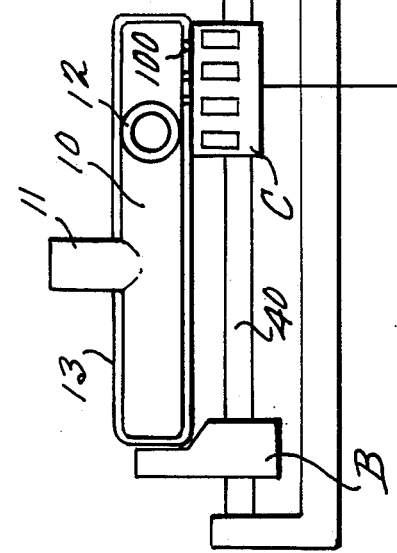
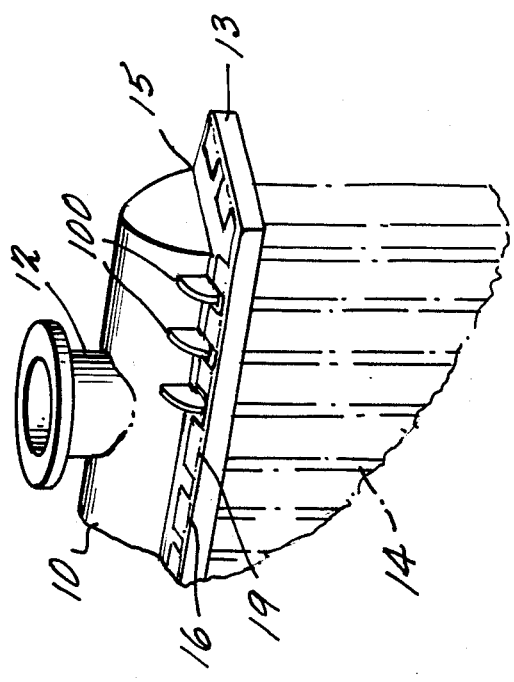

APPARATUS FOR DIE-ASSISTED SQUEEZE-FORMING, INCLUDING DIE STRUCTURE WITH RELATIVELY MOVABLE DIE PARTS FOR ACCOMODATING VARIOUSLY SIZED OR SHAPED WORKPIECES

BACKGROUND OF THE INVENTION

This invention relates to a calking (i.e., crimping) apparatus for calking hooks of plate against container, e.g., a plastic tank. The crimping apparatus of this invention is useful for jointing a core plate of heat exchanger with a tank. It is especially useful for making an automotive engine radiator.

A conventional crimping apparatus has a couple of crimping dies, i.e., an upper die and lower die. A metal plate is held in the lower die, and is crimped while the upper die is coming closer to the lower die. A conventional crimping dies, however, have a fixed shape. Therefore, the conventional crimping dies are used only for a certain shaped metal plate. In other words, when an operator wants to use the same press machine for squeeze-forming more than two shapes of metal plate, he has to change the dies. So, he has to spend a lot of time when he exchanges the dies. Furthermore, since the operator also has to keep a plurality of dies, he has to expend much money for them.

SUMMARY OF THE INVENTION

An object of this invention is to reduce the exchanging time of the die. Another object of this invention is to provide a squeeze-forming apparatus which can change the shape of the die thereof. Further object of this invention is to provide a squeeze-forming apparatus having an especially designed die the shape of which is changed automatically. Still other object of this invention is to provide a calking apparatus which is able to detect the shape of the plate and/or container and is also able to change the shape of die in order to fit the shape of the plate and/or container which had been detected.

According to attain the above objects, the crimping apparatus of the present invention adopts a special designed squeeze-forming die structure which comprises a plurality of small divided movable dies. This die structure can change the shape thereof in order to fit the desired shape by moving certain ones of the movable dies. The apparatus of the present invention provides a detecting means which detects the shape of a plate and/or container, and the detected signal which designates the desired shape of the die is applied to a controlling means. Then, the controlling means controls the movement of the movable dies.

BRIEF DESCRIPTION OF THE DRAWINGS

FIG. 3 is a part of perspective view of a heat exchanger having a plate formed by the apparatus of FIGS. 1 and 2.

FIG. 4 is a schematic view of the apparatus showing a detecting means.

DETAILED DESCRIPTION OF THE INVENTION

Figure 1:
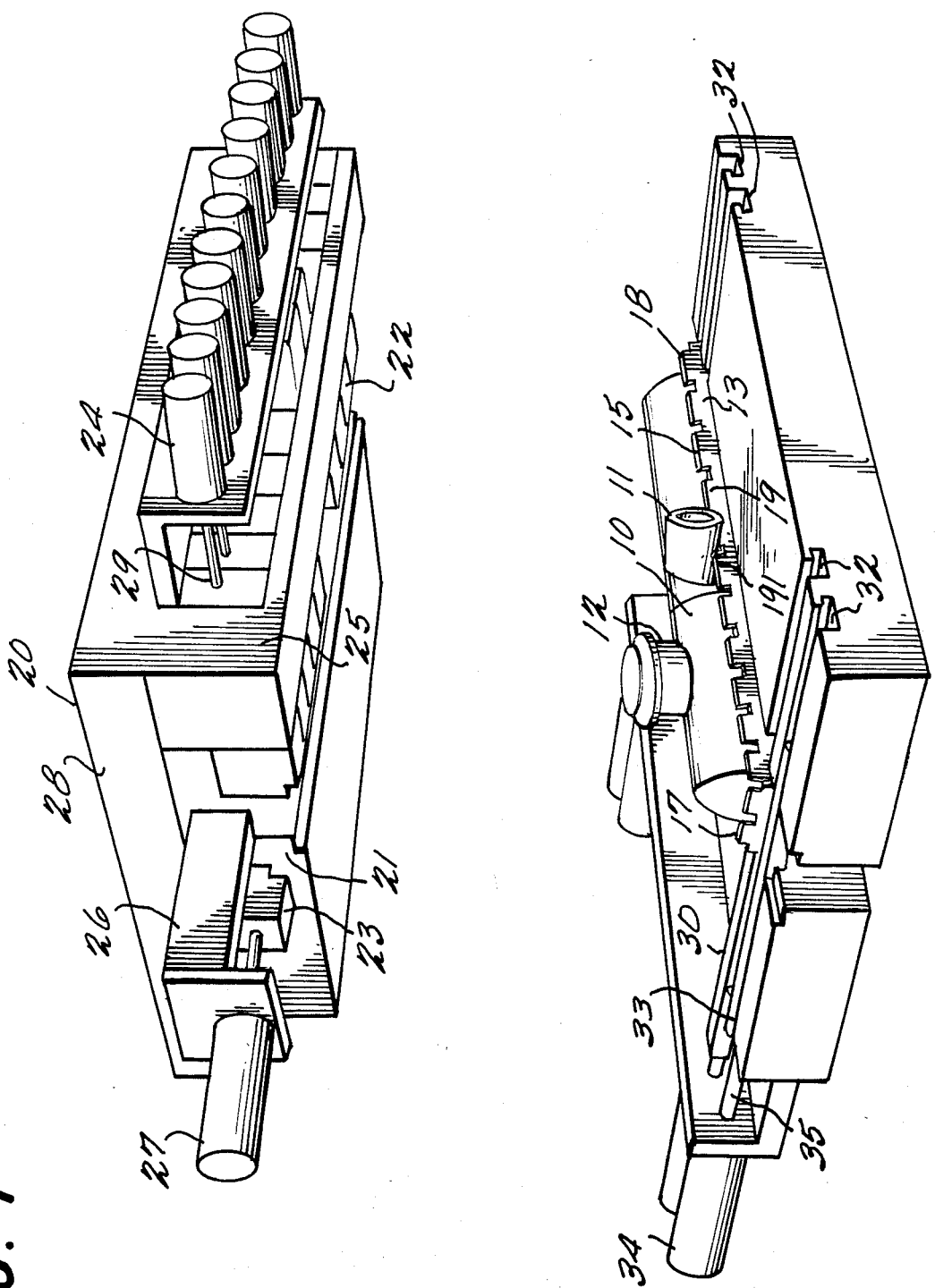
FIG. 1 and FIG. 2 are perspective views of the dies showing the situation before squeeze-forming and the situation after squeeze-forming respectively.
Figure 2:
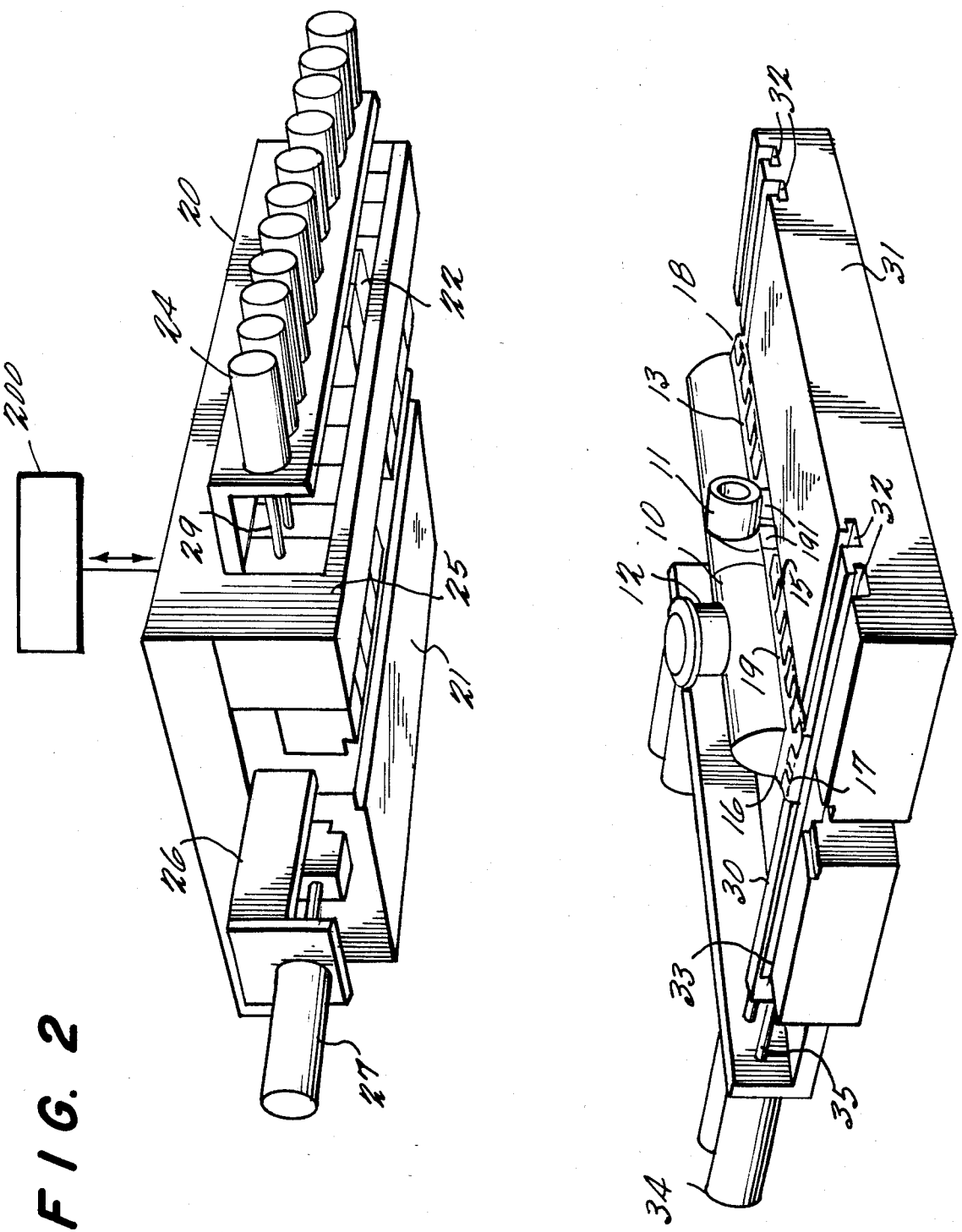

Numeral 10 in FIGS. 1 and 2 designates an upper tank of an automotive radiator, which is made of plastic containing glass fiber as a reinforcement. Upper tank 10 has both an inlet pipe 11 extending horizontally from the side wall of tank 10 and a pouring pipe 12 extending vertically from the upper portion of tank 10. Numeral 13 indicates an upper core plate made of brass. Upper core plate 13 is located between an upper end of radiator core 14 and upper tank 10, as shown in FIG. 3, and is used for connecting tank 10 to radiator core 14.

Numeral 20 indicates an upper squeeze-forming die structure having a fixed die 21 which is located at one side of the die 20 and faces one edge (shown as number 16) of the upper core plate 13, a plurality of movable side dies 22 which are located at another side of the die 20 and face another edge 15 of upper core plate 13, and a couple of movable end dies 23 which are located at the end of die and between fixed die 21 and movable side dies 22 and face both ends 17 and 18 of the upper core plate 13. The plurality of movable side dies 22 are held inside of a holder 25 in such manner that movable side dies 22 can slide along the longitudinal line thereof. Each movable side die 22 is connected with an actuator 24 via connecting rod 29. The actuator of this embodiment is an air cylinder which moves reciprocally. Therefore, movable die 22 is advanced and retracted by an air cylinder 24. Each movable side die 22 is designed so that the width thereof is as wide as the width of the hook 19 for which the movable side die 22 faces. Movable end die 23 is held in a sliding guide 25 and is connected with an air cylinder 27. Though a movable end die 23 is shown at only one end of upper die 20 in FIGS. 1 and 2, another movable end die 23 is provided at the opposite end. Fixed die 21, holder 25 and sliding guide 26 are fixed with an upper die plate 28, and die plate 28 is connected with a press machine 20. Therefore, upper die 20 is moved downward and upward by the press machine.

Numeral 30 designates a lower die which is fixed on a bed (not shown) of the press machine. Numeral 31 indicates a slidable lower die which is slideably mounted on the bed. Both lower dies 30 and 31 have a plurality of guide rails 32; stopper plates 33 are slideably held therein. Stopper plates 33 are connected with an air cylinder 34 via a connecting rod 35.

FIG. 4 schematizes the whole crimping apparatus. Capital letter A in FIG. 4 shows the squeeze-forming part of the apparatus comprising upper and lower dies 20, 30 and 31 described above. Capital letter B shows a carrier which has a gripper and conveys a radiator unit having tank 10, core plate 13 and radiator core 14 toward the squeeze-forming apparatus A along guide bar 40. Capital letter C shows a detector having photoelectric tube and detecting tabs 100 which are integrally provided at the side wall of tank 10. The detecting signal from detector C is applied to a controller D. Controller D determines the shape of tank 10, e.g., the width of tank 10, the length of tank 10 and the portion where inlet tube 11 locates, in accordance with the signal from detector C and Controller D sends a controlling signal into apparatus A for moving movable side dies 22, movable end dies 23 and slideable die 31 in order to make an adequate shape from upper and lower dies 20, 30 and 31.

The calking (i.e., crimping, squeeze-forming) apparatus described above operates as follows:

Each kind of tank 10 is provided with its own distinctive arrangement of tabs 100. Namely the number of tabs 100 and/or the positions of tabs 100 designate the shape of the tank 10. Detector C, therefore, detects the number and/or positions of tabs 100 in order to find out the shape of tank 10, then sends an electric signal to controller D. Controller C stacks the relationship data between the number and/or positions of tabs 100 and the shape of tank 10 in its memory. By this means, controller D determines the required shape of die and sends an electric signal to part A of the apparatus for making upper and lower dies 20, 30 and 31 change to the adequate shape. In particular, according to the electric control signal, air cylinders 24 push or withdraw a plurality of movable side dies 22 in order to adapt to the width of the tank 10; air cylinders 27 also push or withdraw movable end die 23 in order to adapt to the length of the tank 10. At this time, several movable side dies 22 which are located at opposite the inlet pipe 11 are withdrawn in order to avoid crushing the inlet pipe 11 when upper die 20 moves toward tank 10.

On the other hand, the electric control signal is applied to the specific two cylinders 34 and and only the specific air cylinders 34 push stopper plate 33 along guide rail 32 for adapting the length of lower dies 30 and 31 to that of tank 10. The electric control signal is also applied to a sliding machine (not shown) in order to slide the slidable die 31 for adapting the width of the lower dies 30 and 31 to that of core plate 13.

Meanwhile, the radiator unit is carried into lower dies 30 and 31 by carrier B. After the radiator unit is set between lower dies 30 and 31, the press maching 200 begins to work, so that upper die is depressed toward lower dies 30 and 31. As the upper die 20 progresses, hooks 19 of core plate 13 are bent and grip the edge of tank 10.

After hooks 19 are bent completely, upper die 20 withdraws from lower dies 30 and 31. However, as shown in FIG. 2, hooks 191 under inlet pipe 11 are not bent at this time. Therefore, hooks 191 are crimped by another machine, after the radiator unit is detached from lower dies 30 and 31.

Though detector C of above embodiment detects the number and/or position of tabs 100 for finding out the shape of tank 10, other signs, much as the number, position and/or height/or depth of corner or hollow, can also be used. If the shape of tank 10 is found out by reference to another feature or in another way, e.g., an operator reads out the sign, detector C can be eliminated.

As described above, the calking apparatus of this invention can change the shape of squeeze-forming die in order to fit the shape of core plate and tank. In particular, the apparatus of the present invention can crimp many shapes of core plate without changing the whole die. In other words, the operator of the squeeze-forming apparatus of this invention does not have to use much time and steps for changing the shape of the die structure. Therefore, the apparatus of this invention is very useful for use with a plurality of core plates, especially ones in which the shape is different from one from the other in series.

What is claimed is:

1. Die-assisted squeeze-forming apparatus for bending hooks of a plate against a container comprising:
    an upper die structure including a plurality of divided relatively movable dies, said movable being slideably mounted in an upper die plate and each of said movable dies being arranged to be moved by an actuator associated therewith;
    a lower die constructed and arranged for holding said plate and said container therein;
    a controlling means for controlling the movement of said actuator for adapting the shape of said upper die structure to the shape of said plate and said container; and
    a pressing means for pressing said upper die structure toward said lower die in order to bend said hooks against said container.

2. The squeeze-forming apparatus according to claim 1, wherein:
    said upper die structure includes a fixed die at one side thereof, and said movable dies are located at an opposite side of said upper die structure from said fixed die.

3. The squeeze-forming apparatus according to claim 1, wherein:
    said lower die is comprised of a fixed lower die and a slidable lower die, said slidable lower die being constructed and arranged to be slid in order to change the space between said fixed lower die and said slidable lower die.

4. The squeeze-forming apparatus according to claim 3, wherein:
    said slidable lower die is arranged to be controlled as to the sliding movement thereof by said controlling means.

5. The squeeze-forming apparatus according to claim 1, wherein:
    the width of said movable die is as wide as that of the hook which is to be bent thereby.

6. Die-assisted squeeze-forming apparatus for bending hooks of a plate against a container comprising:
    an upper die structure including a plurality of divided, relatively movable dies, said movable dies being slidably mounted in an upper die plate, and each of said movable die being arranged to be individually moved by an actuator;
    a lower die constructed and arranged for holding said plate and said container therein;
    a detecting means for detecting the shape of at least one of said plate and said container; and
    a controlling means for controlling the movement of said actuator in accordance with a signal from said detecting means for adapting the shape of said upper die structure to the shape of said plate and said container.

7. The squeeze-forming apparatus according to claim 6 wherein:
    said detecting means is constructed and arranged to detect a distinctive sign provided on each container for determining the shape of such container.

8. The squeeze-forming apparatus according to claim 7 wherein:
    said sign which said detecting means is constructed and arranged to detect is at least one tab extending from a wall of said container.

9. The squeeze-forming apparatus according to claim 7, wherein:
    said detecting means includes a photoelectric tube for detecting at least one of the number and position of said sign.

10. The squeeze-forming apparatus according to claim 7, wherein:
    said controlling means includes a memory for memorizing the relationship between the signal from said detecting means including at least one of the number and position of said sign and the shape of at least one of said plate and said container, and said controlling means is constructed and arranged to send a controlling signal in accordance with data held in said memory to said actuator.

11. The squeeze-forming apparatus according to claim 6, wherein:
said upper die structure includes a fixed die at one side thereof, and one said movable dies is located at an opposite side of said upper die structure from said fixed die.

12. The squeeze-forming apparatus according to claim 6, wherein:
said lower die is comprised of a fixed lower die and slidable lower die, said slidable lower die being arranged to be slid in order to change the space between said fixed lower die and said slidable lower die.

13. The squeeze-forming apparatus according to claim 12, wherein:
said slidable lower die is arranged to be controlled as to the sliding movement thereof by said controlling means.

14. The squeeze-forming apparatus according to claim 6, wherein:
the width of said movable die is as wide as that of the hook which is to be bent thereby.

* * * * *